(12) United States Patent
Barton

(10) Patent No.: US 9,943,788 B2
(45) Date of Patent: Apr. 17, 2018

(54) FILTRATION APPARATUS

(71) Applicant: Alconbury Weston Ltd, Stoke-on-Trent, Staffordshire (GB)

(72) Inventor: Alastair William Barton, Stoke-on-Trent (GB)

(73) Assignee: Alconbury Weston Ltd, Stoke-on-Trent (GB)

( * ) Notice: Subject to any disclaimer, the term of this patent is extended or adjusted under 35 U.S.C. 154(b) by 129 days.

(21) Appl. No.: 14/916,189

(22) PCT Filed: Sep. 1, 2014

(86) PCT No.: PCT/GB2014/052641
§ 371 (c)(1),
(2) Date: Mar. 3, 2016

(87) PCT Pub. No.: WO2015/033117
PCT Pub. Date: Mar. 12, 2015

(65) Prior Publication Data
US 2016/0220928 A1     Aug. 4, 2016

(30) Foreign Application Priority Data

Sep. 6, 2013 (GB) .................................. 1315905.8

(51) Int. Cl.
| | | |
|---|---|---|
| *B01D 29/01* | (2006.01) |
| *B01D 29/52* | (2006.01) |
| *B01D 29/70* | (2006.01) |
| *B01D 29/78* | (2006.01) |
| *B01D 29/84* | (2006.01) |
| *B01D 29/94* | (2006.01) |
| *B01D 29/96* | (2006.01) |

(52) U.S. Cl.
CPC ............. *B01D 29/96* (2013.01); *B01D 29/01* (2013.01); *B01D 29/52* (2013.01); *B01D 29/70* (2013.01); *B01D 29/78* (2013.01); *B01D 29/843* (2013.01); *B01D 29/94* (2013.01); *B01D 2201/204* (2013.01)

(58) Field of Classification Search
None
See application file for complete search history.

(56) References Cited

U.S. PATENT DOCUMENTS

| | | | | |
|---|---|---|---|---|
| 3,404,780 A | * | 10/1968 | Jungner ................. | B01D 29/03 |
| | | | | 210/142 |
| 3,730,352 A | | 5/1973 | Cohen et al. | |
| 3,860,395 A | * | 1/1975 | Kehse ................ | B01D 11/0238 |
| | | | | 127/6 |

(Continued)

FOREIGN PATENT DOCUMENTS

FR           345613 A         12/1904

*Primary Examiner* — Benjamin M Kurtz
(74) *Attorney, Agent, or Firm* — Law Offices of Michael L Wise, LLC

(57) ABSTRACT

A filtration apparatus (10) with a rotatable carousel (18) including five equispaced cylindrical chambers (22). Beneath the chambers (22) a kidney shaped filter plate (40) is provided, and also a downwardly extending opening (36). The chambers (22) are selectively moveable to be located over the filter (40), or over the opening (36), in which latter position material can be ejected from the respective chamber (22) by a piston and cylinder (34) located spaced above the opening (36).

21 Claims, 5 Drawing Sheets

(56) References Cited

U.S. PATENT DOCUMENTS

| | | | | |
|---|---|---|---|---|
| 4,522,726 | A | * | 6/1985 | Berry ................. B01D 11/0273 210/264 |
| 5,620,728 | A | * | 4/1997 | Langley ............... B01D 11/023 426/312 |
| 2007/0158261 | A1 | | 7/2007 | Wnuk |
| 2007/0292935 | A1 | | 12/2007 | Franco et al. |

* cited by examiner

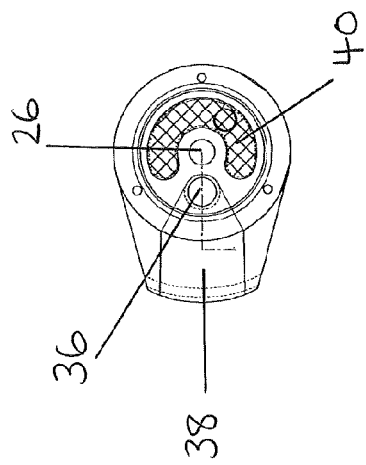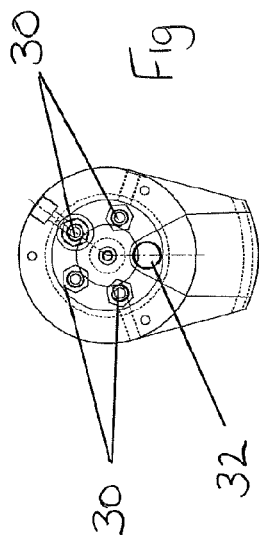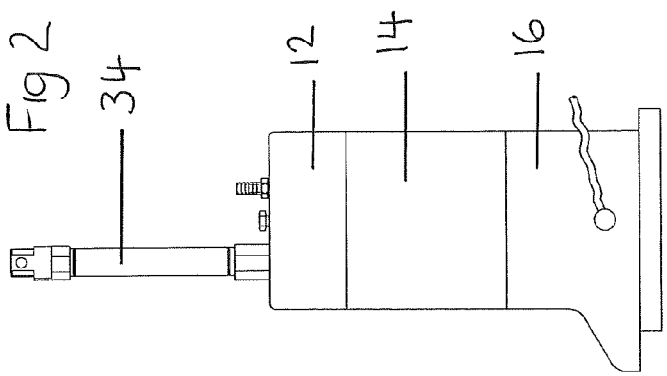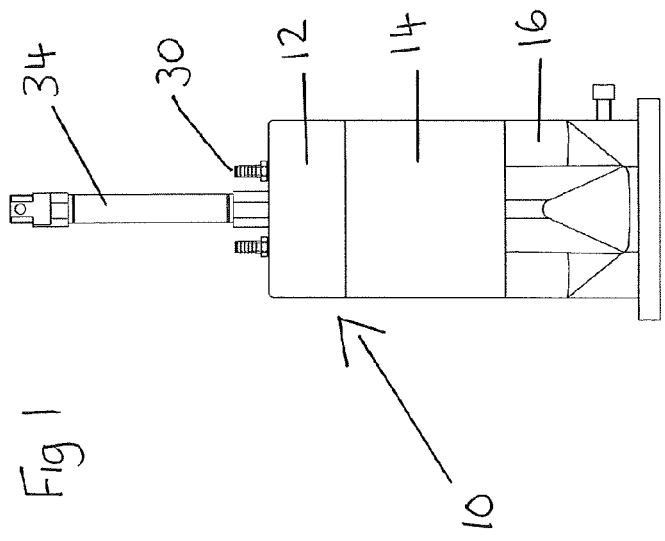

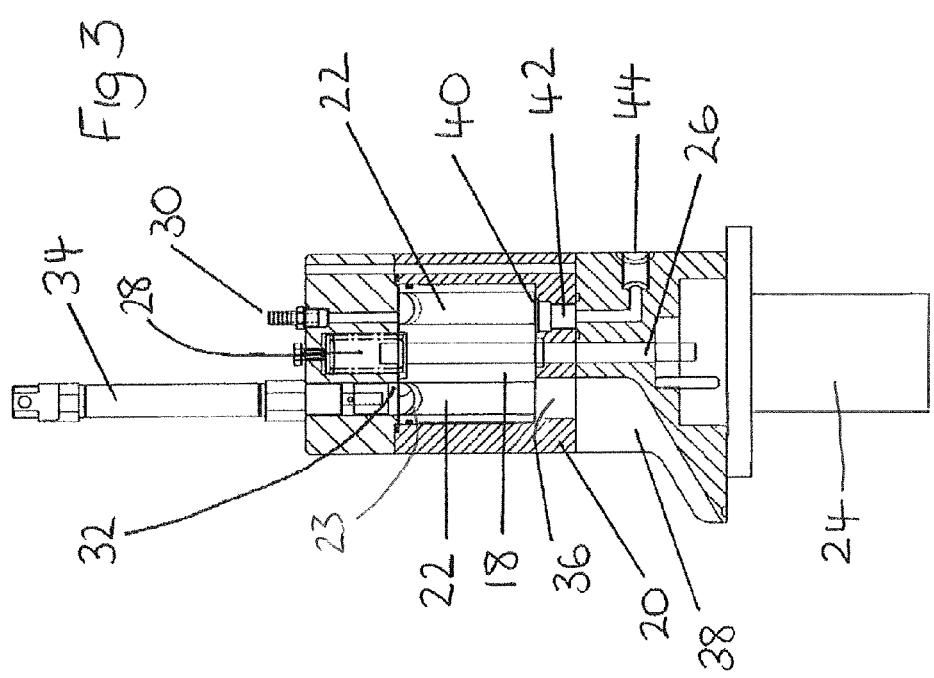

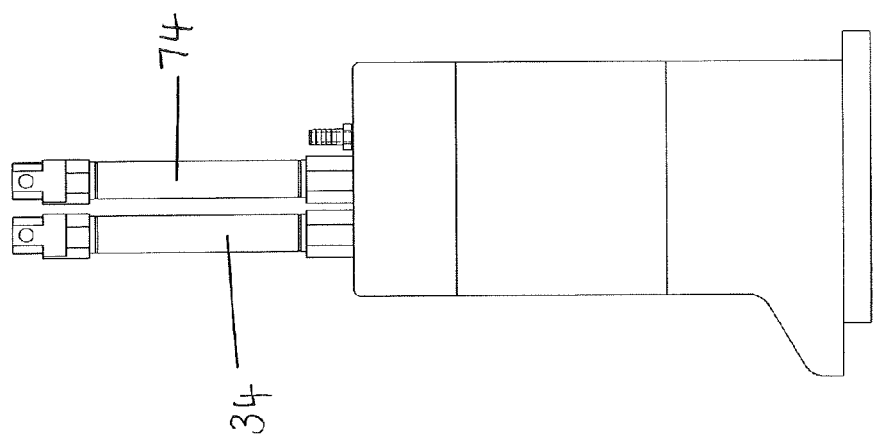
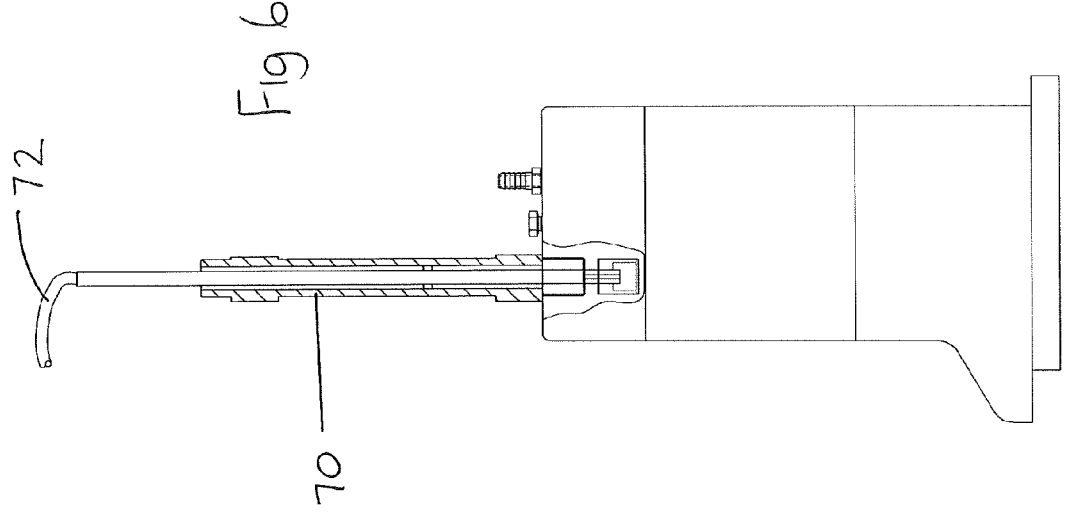

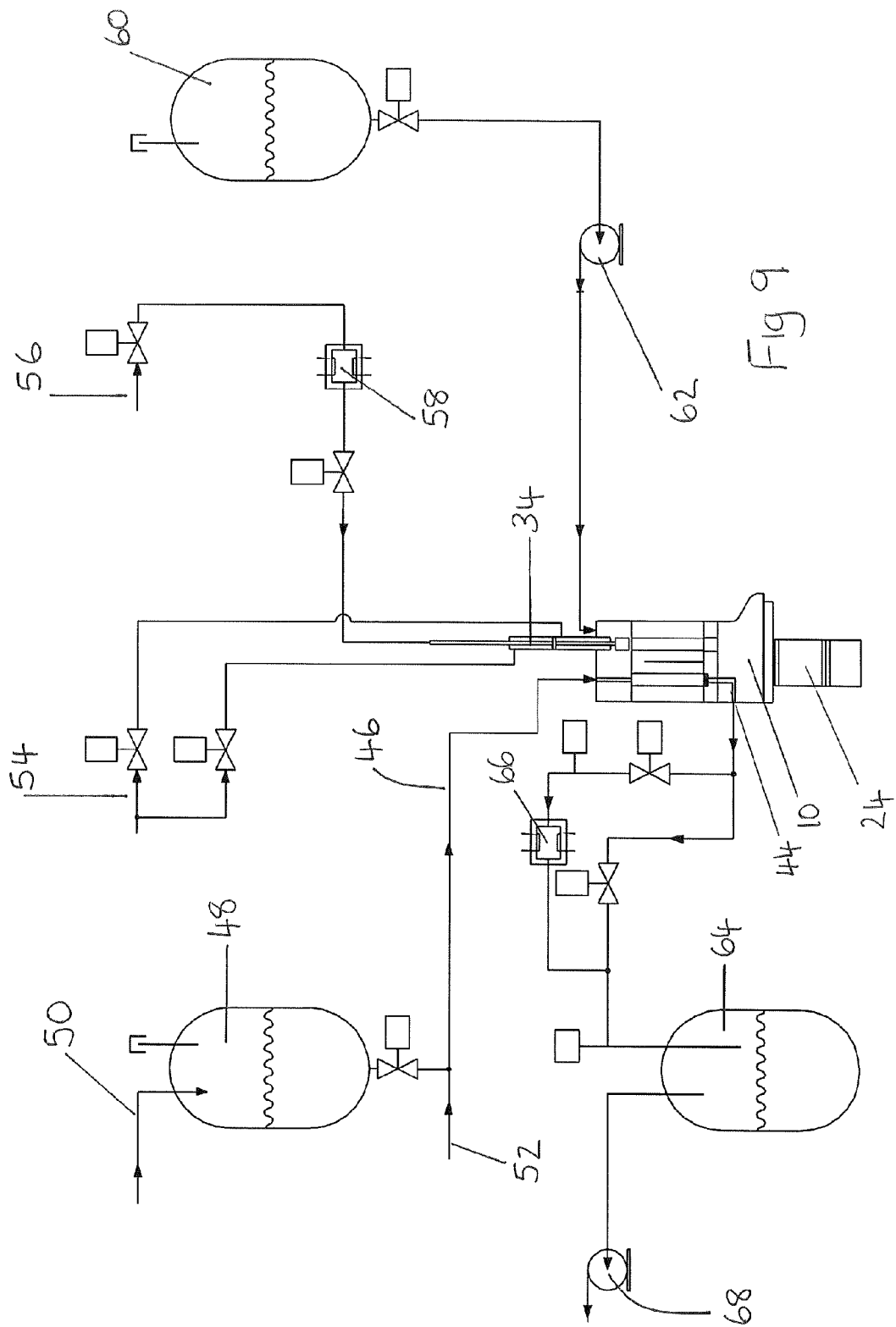

FILTRATION APPARATUS

This invention concerns filtration apparatus, and particularly but not exclusively apparatus for filtering suspended solids from a liquid.

A wide range of filtration apparatus already exists. Filtration apparatus typically used in the pharmaceutical industry often works on a batch process and requires a very large surface area filter element to provide for a required removal of liquid from for instance a suspension of solids.

According to the present invention there is provided filtration apparatus, the apparatus comprising an upper part with a plurality of chambers, a supply arrangement to enable material to be filtered to be supplied into a selective one of the chambers, and a lower part defining a plurality of stations, the upper part being selectively movable relative to the lower part to bring the chambers respectively into alignment with a required one of the stations, at least one of the stations including a filter member to enable material located in a chamber above the filter member to be filtered, a further station defining a discharge opening to enable filtered material in a chamber thereabove to be discharged from the apparatus.

The upper part may be movable relative to the supply arrangement to enable material to be supplied to a respective required one of the chambers.

The upper part may be rotatably movable relative to the lower part, and a motor may be provided to provide rotational movement of the upper part.

A top part may be provided which includes at least part of the supply arrangement, and the upper part may be rotatably movable relative to the top part.

More than two chambers may be provided in the upper part, and a filter member may be provided in use to extend beneath at least two chambers, and a single filter member may be arranged to extend in use between two chambers located thereabove.

A pusher member may be provided for pushing filtered material from a chamber when located above the discharge opening. The pusher member may be selectively extendible from the top part into a respective selected chamber in the upper part.

The pusher member may be powered by compressed air or another fluid.

A washing arrangement may be provided for washing filtered material in a respective chamber, and the washing arrangement may be located above a filter member in the lower part such that washing fluid can discharge or be extracted through the filter member. The washing arrangement may comprise a supply of solvent or other liquid to remove impurities from the filtered material.

A drying arrangement may be provided for drying filtered material in a chamber, and the drying arrangement may be located above a filter member in the lower part.

The drying arrangement may comprise a supply of gas which may be nitrogen or air. A heater may be provided for heating the gas prior to delivery into a chamber.

A pressurising arrangement may be provided for applying increased pressure to material in a chamber to urge fluid therefrom.

A source of reduced pressure may be provided connected to the lower part beneath the filter member.

In one embodiment five chambers are provided, with the filter elements extending beneath four of the chambers.

Embodiments of the present invention will now be described by way of example only and with reference to the accompanying drawings, in which:—

FIG. 1 is a front view of a first filtration apparatus according to the invention;

FIG. 2 is a side view of the apparatus of FIG. 1;

FIG. 3 is a cross sectional side view of the apparatus of FIG. 1;

FIG. 4 is a plan view of the apparatus of FIG. 1;

FIG. 5 is a cross sectional plan view of the apparatus of FIG. 1;

FIG. 6 is a side view showing a first alternative configuration;

FIG. 7 is a side view showing a second alternative configuration;

FIG. 9 is a schematic view of a filtration system incorporating the apparatus of FIG. 1.

Figure 8:
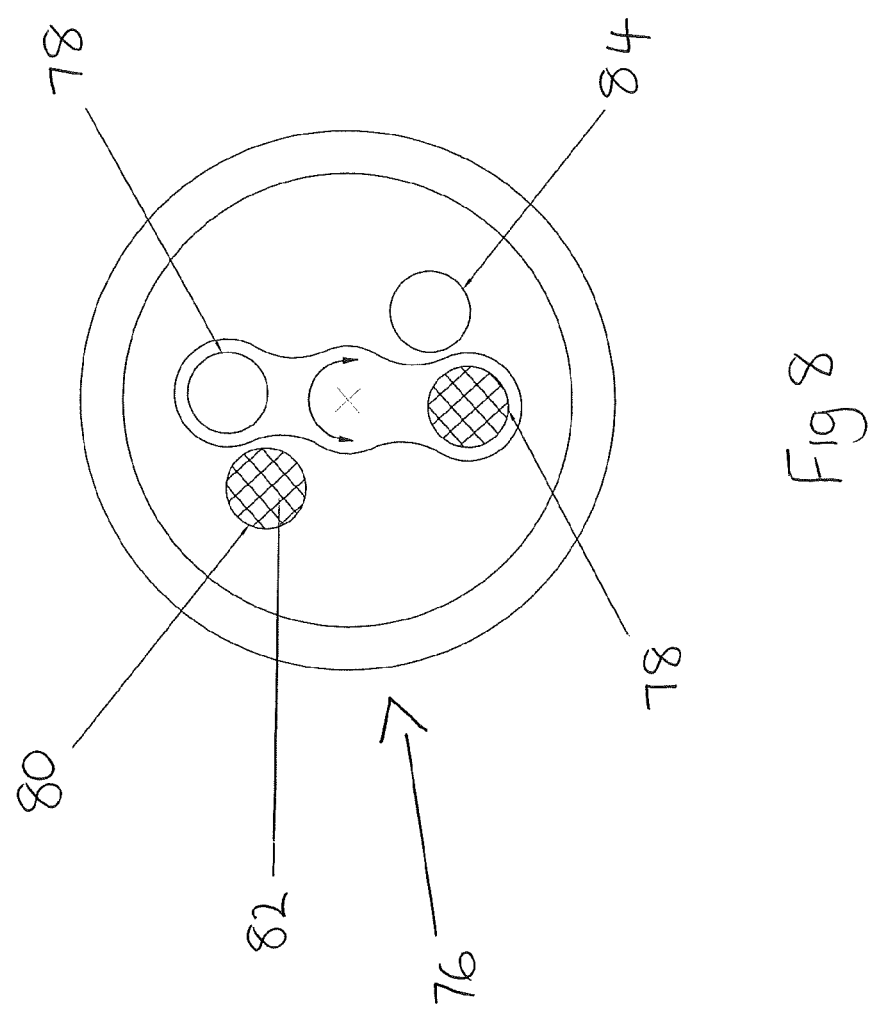
FIG. 8 is a diagrammatic cross sectional plan view of a further filtration apparatus according to the invention.

FIGS. 1-5 show a filtration apparatus 10 comprising a top part 12, upper part 14 and lower part 16. The upper part 14 includes a carousel 18 rotatingly mounted in a body 20. Five equispaced equisized cylindrical chambers 22 extend from the top to bottom of the carousel 18. The rear edges 23, in the direction of rotation, of the top of the chambers 22, are sloped such that if a chamber 22 is full of fluid, any further fluid entering thereinto will flow over into the next most chamber 22 in a rearwards direction.

A rotary drive motor 24 is provided for rotating the carousel via a drive shaft 26 to a required orientation, and a tension spring and adjuster 28 is provided extending from the underside of the top part 12 to adjust movement of the carousel 18 and maintain pressure on the carousel 18.

Four inlet ports 30 are provided in the top part 12 corresponding to the position of four of the chambers 22 whilst an opening 32 towards the front of the apparatus 10 is provided. A piston and cylinder 34 is provided directly above the opening 32 and is selectively extendible through the opening 32 and into a chamber 22 located therebeneath to eject material therefrom. An aligned opening 36 is provided in the body 20 beneath the opening 32, and the aligned opening 36 leads to a discharge chute 38.

A generally kidney shaped filter plate 40 is provided in the body 20 located immediately beneath the four chambers 22 which are not aligned with the openings 32, 36. A manifold 42 is provided beneath the filter plate 40 and a vacuum port 44 is connected to the manifold 42.

In use, a supply of slurry 46 to be filtered as shown in FIG. 9, would be connected to a one of the inlet ports 30, and it would be the first inlet port 30 from the opening 32 moving in the direction of rotation of the carousel 18. As shown in FIG. 9 the slurry supply 46 may be from a slurry buffer vessel 48 with an inlet 50, or via a constant feed 52 for example from a continuous reactor/crystalliser.

A supply 54 of compressed air or other gas may be connected to a one of the inlet ports 30 to urge material in a respective one of the chambers 22 against the filter member 40 to urge liquid therefrom. The compressed air supply could also be used to actuate the piston and cylinder 34.

A gas supply 56 which could for instance be of nitrogen or air may be connected to another of the inlet ports 32 for drying the filtered material, and a heater 58 for the gas may be provided.

A supply of washing solvent 60 may be connected via a pump 62 or may be gravity fed, to another of the inlet ports 30. A typical ordering of the inlet ports would be initial filtration, compression, washing and then drying. Different steps can though be used for different conditions, and in some instances additional chambers would be provided to enable a greater number of stages. The vacuum port 44 connects to a filtrate vessel 64, optionally via a condenser 66, and to a vacuum pump 68.

In use, material is supplied to a first of the chambers 22. Some filtration may occur at this time, and the chamber 22 is subsequently moved to a second position still over the filter plate 40. Reduced pressure via the vacuum port 44 will enhance the filtration of material located above the filter plate 40. In certain instances in this position or in a further position, compressed gas may be supplied into the respective chamber 22 to urge more moisture from the material.

The material may be washed with solvent from the vessel 60 in a further position of the chamber 22, and subsequently dried, optionally with heated gas in a final position of the chamber 22. When the chamber 22 is above the opening 36, the material which would generally now be in the form of a pellet, is discharged by the piston and cylinder arrangement 34 to pass down the chute 38.

There is thus described filtration apparatus which enables a number of steps such as filtration, washing, and drying, to be carried out on a continuous basis, whilst still providing a compact apparatus. The steps to be carried out in the filtration can be selected as required.

FIG. 6 shows a variation in using a hollow piston and cylinder arrangement 70 to enable a gas or liquid supply 72 to extend down through the centre of the piston and cylinder arrangement 70.

FIG. 7 shows a further arrangement with the existing piston and cylinder 34 and a further piston and cylinder arrangement 74 for applying mechanical pressure to the top of the filtered material to urge further liquid therefrom.

FIG. 8 shows a further filtration apparatus 76 of a more basic configuration. In this instance just two chambers 78 are provided which are selectively movable to be aligned in a first position 80 above a filter plate 82, in which position the chamber 78 can be filled, and the material subsequently filtered and washed. A second position 84 is provided with an opening leading out of the apparatus 76, and a similar piston and cylinder arrangement (not shown) would be provided to discharge filtered material from a chamber 78 when located above the opening 84.

Various other modifications may be made without departing from the scope of the invention. For example as indicated, different numbers of chambers can be provided with appropriate filter members and openings to enable required processes to be carried out to the material being filtered. The filter member may be differently shaped, and could for instance be disc shaped. Whilst the invention has been described in terms of a rotatable carousel, these spaces could be provided in a member which moves in a different manner.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A filtration apparatus, the apparatus comprising an upper part with a plurality of chambers, a supply arrangement to enable material to be filtered to be supplied into a selective one of the chambers, and a lower part defining a plurality of stations, the upper part being selectively movable relative to the lower part to bring the chambers respectively into alignment with a required one of the stations, at least one of the stations including a filter member to enable material located in a chamber above the filter member to be filtered, a further station defining a discharge opening to enable filtered material in a chamber thereabove to be discharged from the apparatus, in which a pusher member is provided for pushing filtered material from a chamber when located above the discharge opening.

2. The apparatus according to claim 1, in which the upper part is movable relative to the supply arrangement to enable material to be supplied to a respective required one of the chambers.

3. The apparatus according to claim 2, in which the upper part is rotatably movable relative to the lower part.

4. The apparatus according to claim 3, in which a motor is provided to provide rotational movement of the upper part.

5. The apparatus according to claim 1, in which a top part is provided which includes at least part of the supply arrangement.

6. The apparatus according to claim 5, in which the upper part is rotatably movable relative to the top part.

7. The apparatus according to claim 1, in which more than two chambers are provided in the upper part.

8. The apparatus according to claim 7, in which the filter member is provided in use to extend beneath at least two chambers.

9. The apparatus according to claim 8, in which the filter member is a single filter member arranged to extend in use between two chambers located thereabove.

10. The apparatus according to claim 1, in which a top part is provided which includes at least part of the supply arrangement and the pusher member is selectively extendible from the top part into a respective selected chamber in the upper part.

11. The apparatus according to claim 1, in which the pusher member is powered by compressed air or another fluid.

12. The apparatus according claim 1, in which a washing arrangement is provided for washing filtered material in a respective chamber.

13. The apparatus according to claim 12, in which the washing arrangement is located above the filter member in the lower part such that washing fluid can discharge or be extracted through the filter member.

14. The apparatus according to claim 12, in which the washing arrangement comprises a supply of solvent or other liquid to remove impurities from the filtered material.

15. The apparatus according to claim 1, in which a drying arrangement is provided for drying filtered material in a chamber.

16. The apparatus according to claim 15, in which the drying arrangement is located above the filter member in the lower part.

17. The apparatus according to claim 15, in which the drying arrangement comprises a supply of gas.

18. The apparatus according to claim 17, in which a heater is provided for heating the gas prior to delivery into a chamber.

19. The apparatus according to claim 1, in which a source of reduced pressure is provided connected to the lower part beneath the filter member.

20. The apparatus according to claim 7, in which five chambers are provided, with the filter member or members extending beneath four of the chambers.

21. A filtration apparatus, the apparatus comprising an upper part with a plurality of chambers, a supply arrangement to enable material to be filtered to be supplied into a selective one of the chambers, and a lower part defining a plurality of stations, the upper part being selectively movable relative to the lower part to bring the chambers respectively into alignment with a required one of the stations, at least one of the stations including a filter member to enable material located in a chamber above the filter member to be filtered, a further station defining a discharge opening to enable filtered material in a chamber thereabove to be discharged from the apparatus, in which a pressurising arrangement is provided for applying increased pressure to material in a chamber to urge fluid therefrom.

* * * * *